US010229603B2

(12) United States Patent
Srinivasan et al.

(10) Patent No.: US 10,229,603 B2
(45) Date of Patent: Mar. 12, 2019

(54) SYSTEMS AND METHODS FOR PROVIDING ATC CENTER DATA TO AIRCRAFT

(71) Applicant: Honeywell International Inc., Morristown, NJ (US)

(72) Inventors: Divya Swarup Giriyappa Srinivasan, Bangalore (IN); Thomas D. Judd, Woodinville, WA (US)

(73) Assignee: Honeywell International Inc., Morris Plains, NJ (US)

( * ) Notice: Subject to any disclaimer, the term of this patent is extended or adjusted under 35 U.S.C. 154(b) by 320 days.

(21) Appl. No.: 13/916,638

(22) Filed: Jun. 13, 2013

(65) Prior Publication Data

US 2014/0372018 A1 Dec. 18, 2014

(51) Int. Cl.
| | |
|---|---|
| *G06F 19/00* | (2018.01) |
| *G06G 7/70* | (2006.01) |
| *G06G 7/76* | (2006.01) |
| *G08G 5/00* | (2006.01) |
| *H04B 7/185* | (2006.01) |
| *H04L 29/08* | (2006.01) |
| *H04W 4/00* | (2018.01) |

(52) U.S. Cl.
CPC ....... *G08G 5/0013* (2013.01); *H04B 7/18506* (2013.01)

(58) Field of Classification Search
CPC .................................. G06G 7/76; G08G 5/00
USPC ................. 701/120; 370/331; 455/414.4
See application file for complete search history.

(56) References Cited

U.S. PATENT DOCUMENTS

| 6,438,468 B1 | 8/2002 | Muxlow et al. |
| 2006/0167618 A1* | 7/2006 | Werback ................ 701/120 |
| 2008/0045198 A1* | 2/2008 | Bhogal ............. G08G 5/0013 |
| | | 455/414.4 |

(Continued)

FOREIGN PATENT DOCUMENTS

| EP | 2447929 | 10/2010 |
| EP | 2383714 | 4/2011 |

(Continued)

OTHER PUBLICATIONS

European Patent Office, "European Search Report for Application No. 14170439.5", "from Foreign Counterpart U.S. Appl. No. 13/916,638", dated Oct. 29, 2014, pp. 1-7, Published in: EP.

*Primary Examiner* — Mahmoud S Ismail
(74) *Attorney, Agent, or Firm* — Fogg & Powers LLC (57) ABSTRACT

Systems and methods for providing air traffic control center data to aircraft is provided. In certain embodiments an avionics system includes a communication device configured to communicate with a data center and an air traffic control center; and a processing unit configured to execute machine readable instructions. In at least one embodiments, the machine readable instructions cause the processing unit to manage communications associated with the flight of an aircraft, wherein the communications are communicated through the communication device with the data center; distinguish identifying information received through the communication device, wherein the identifying information identifies at least one of the air traffic control center and associated aeronautical telecommunications network address; and establish a communication session with the air traffic control center using the identifying information received through the communication device.

20 Claims, 6 Drawing Sheets

(56) References Cited

U.S. PATENT DOCUMENTS

2008/0163093 A1    7/2008  Lorido
2008/0192693 A1*  8/2008  Borel ................. H04B 7/18506
                                                                            370/331

FOREIGN PATENT DOCUMENTS

EP          2337000        6/2011
EP          2447929 A1 *  5/2012
WO       2007064733     6/2007

* cited by examiner

FLIGHT INITIALIZATION

FLIGHT NUMBER: HON1234
SCHEDULED DATE: --
DEPARTURE STATION: KPHX
DESTINATION STATION: KSCA

FLIGHT INITIALIZATION

FLIGHT NUMBER: HON1234
SCHEDULED DATE: --
DEPARTURE STATION: KPHX
DESTINATION STATION: KSCA

ATC LOGON/STATUS

LOGON TO: ☐☐☐☐☐☐☐☐
FLIGHT NUMBER: ANA1212

ORIGIN: KPHX    DESTINATION: KSCA
ATC CONNECTION: NOT ESTABLISHED
ACTIVE CENTER:
NEXT CENTER:

SYSTEMS AND METHODS FOR PROVIDING ATC CENTER DATA TO AIRCRAFT

BACKGROUND

Due to various aeronautical telecommunications network (ATN) mandates, in coming years, it may become mandatory for all commercial aircraft to have a Protected Mode Controller Pilot Data Link Communications (PM-CPDLC) datalink capability. In order to support these future mandates, the number of air traffic control (ATC) centers that are upgraded to support ATN will increase. When supporting ATN, a pilot logs on to a CPDLC session with an ATC center to establish a communication link with the ATC center. Typically, to log on to a CPDLC session with an ATC Center, as part of flight preparation, a pilot identifies an ATC center and accompanying identification information in an airport data sheet or the pilot may remember the ATC center from experience.

However, when a pilot is unable to remember the ATC center, the pilot spends time searching through materials to acquire the needed information from a source of ATC center information. In some situations, when a pilot attempts to identify an ATC center in a source of ATC center information (such as a data sheet), the pilot may have to identify an ATC center in a list of multiple ATC centers. The pilot's selection of an ATC center in a list of multiple ATC centers has an accompanying probability that the pilot may select the wrong ATC center. Also, if a pilot enters in data that fails to match an ATC center, the pilot may have to spend further time to find and reenter the correct ATC center. In certain embodiments, to aid a pilot in entering the correct ATC center information, the ATN ATC center data is stored in a database. To enter in the correct data, a flight crew member may enter the ATN ATC name and the database provides the ATN address for the identified ATN ATC center. However, as an ATC center upgrades to an ATN center or if the address changes for the ATN center, the database on an aircraft becomes outdated and the database may be updated to enable communications with the upgraded ATN ATC center to enable communications with the ATN ATC center. However, updating the database on all aircraft in a fleet of aircraft is a large effort, especially as more and more ATC centers upgrade to ATN centers or as the addresses for the ATN centers change.

SUMMARY

Systems and methods for providing air traffic control center data to aircraft is provided. In certain embodiments an avionics system includes a communication device configured to communicate with a data center and an air traffic control center; and a processing unit configured to execute machine readable instructions. In at least one embodiments, the machine readable instructions cause the processing unit to manage communications associated with the flight of an aircraft, wherein the communications are communicated through the communication device with the data center; distinguish identifying information received through the communication device, wherein the identifying information identifies at least one of the air traffic control center and associated aeronautical telecommunications network address; and establish a communication session with the air traffic control center using the identifying information received through the communication device.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments for providing ATC center data to aircraft are described below. In certain implementations, where an aircraft attempts to establish a communication link with an ATC center, a pilot may send a flight initialization downlink request through an avionic communication system located on the airplane, where the flight initialization downlink request is sent to a data center. In response to the flight initialization downlink request, the data center may provide identifying information for ATC centers through an uplink such that the pilot may logon to a communication session with the ATC center. Further, in certain implementations, when the avionic communication system receives the ATC identifying information, the avionic communication system may store the ATC identifying information in a database for future use. In an alternative implementation, a ground command center or other ground station that provides operational commands to aircraft may provide the ATC identifying information to the aircraft instead of the ATC center. By providing the ATC identifying information through either the ground command center or the ATC center, the aircraft is able to ensure that communication sessions between aircraft and ATC centers are established more easily.

Figure 1:
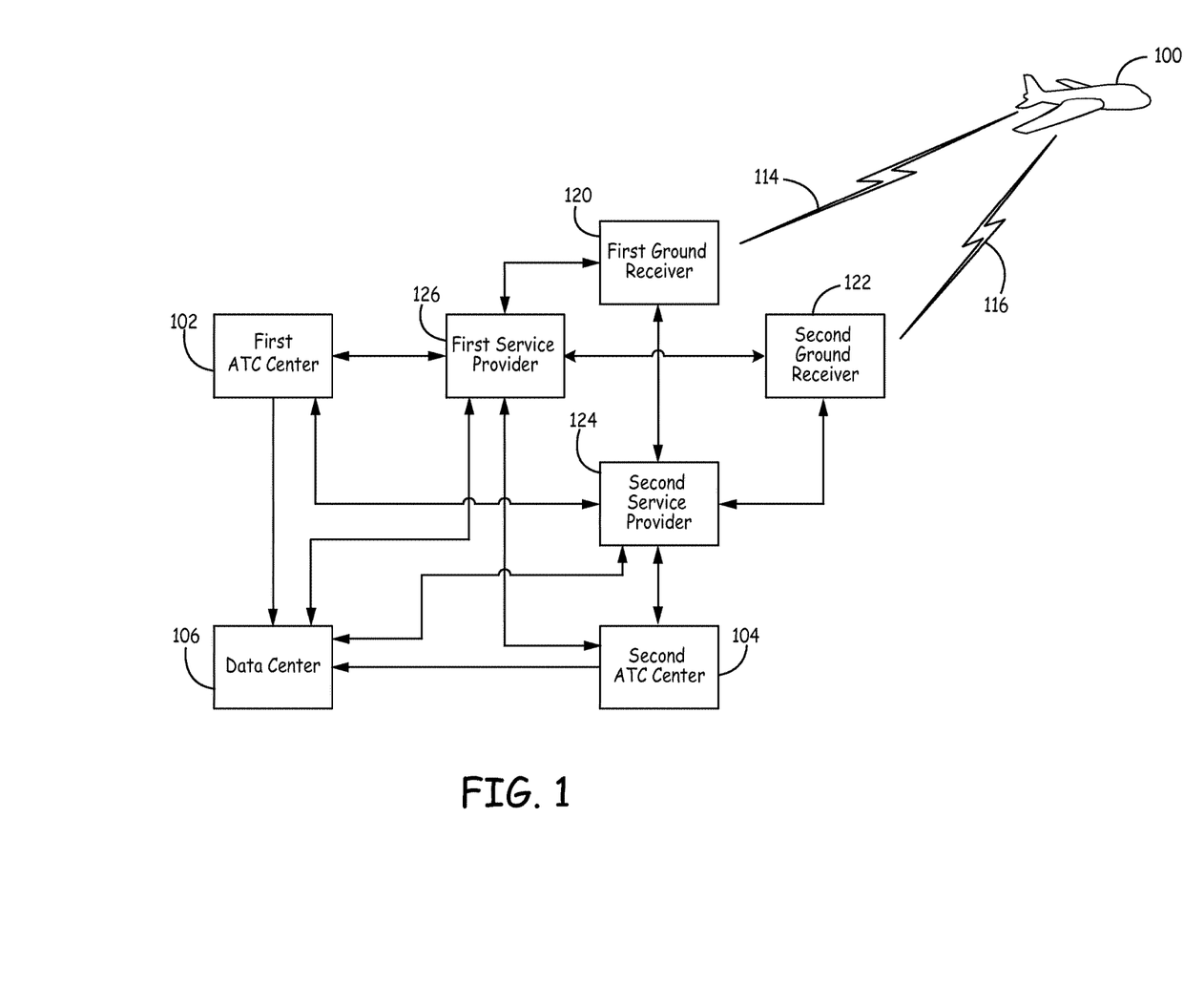
FIG. 1 is a diagram of an aircraft in communication with an ATC center and a data center in one embodiment described in the present disclosure.

FIG. 1 is a diagram illustrating an aircraft 100 communicating with different communication centers located on the ground. In at least one exemplary embodiment, the ground communication centers include a first ATC center 102, a second ATC center 104, and a data center 106. As the aircraft 100 travels between destinations, the aircraft 100 communicates with ATC centers that are responsible for managing the airspace along the flight path of the aircraft 100. For example, when the aircraft 100 is in the airspace managed by the first ATC center 102, the aircraft 100 establishes a communication session with the first ATC center 102.

When establishing a communication session with either the first ATC center 102, the second ATC center 104, or the data center 106, the aircraft 100 may communicate directly with the first ATC center 102, the second ATC center 104, or the data center 106. In contrast, the aircraft may establish a communication session with either the first ATC center 102, the second ATC center 104, or the data center 106 by communicating through ground receivers and service providers. In at least one implementation, the aircraft 100 form a first communication link 114 with a first ground receiver 120. The first ground receiver 120 may be in communication with both either the first service provider 126 or the second service provider 124. The first service provider 126 and the second service provider 124 communicate data between the aircraft 100 and the first ATC center 102, the second ATC center 104, or the data center 106. In another implementation, the aircraft 100 forms a second communication link 116 with a second ground receiver 122, where the second ground receiver 122 communicates like the first ground receiver 120 in communicating data between the aircraft 100 and the first ATC center 102, the second ATC center 104, or the data center 106. In at least one embodiment, in forming the first communication link 114 and the second communication link 116, the aircraft 100 establishes communication links such as, but not limited to VHF, satellite communications (SATCOM), or high frequency datalink (HFDL) communications.

In certain embodiments, to establish a communication session with an ATC Center 102, the aircraft 100 uses ATC identifying information that uniquely identifies a particular ATC center. In certain implementations, an ATC center functions as a future air navigation system (FANS) ATC center. In at least one implementation, where the first ATC center 102 functions as a FANS ATC center, the communication session is established between the first ATC center 102 and the aircraft 100, when the pilot transmits a four character International Civil Aviation Organization (ICAO) code that identifies the first ATC center 102. When the first ATC center 102 receives a transmission from the aircraft 100 of the identifying ICAO code, the first ATC center 102 responds with an acknowledgement that the identifying code was received. Thus, to establish a communication session with the first ATC center 102 or other FANS ATC center, an aircraft merely uses a relatively small identifying code.

However, more frequently, ATC centers are becoming aeronautical telecommunication network (ATN) ATC centers. To establish a communication session with an ATN ATC center, a unique address is used that identifies the ATN ATC center. To aid pilots and other flight crew members in establishing a communication session with an ATN ATC center, some avionics systems (such as a controller-pilot data link communication (CPDLC) system) include a database having the ATN addresses of the different possible ATN ATC centers. However, as an ATN ATC center comes online or if its ATN address changes, the databases on the multiple aircraft have to be updated in order to accurately contain all the different ATN ATC centers and associated ATN addresses with which an aircraft can possibly communicate as it travels. To update the many different databases is a time consuming endeavor as a database is certified and then uploaded onto individual avionics systems on each aircraft in a fleet of aircraft.

To establish a communication session between the aircraft 100 and either of the first ATC center 102 or the second ATC center 104, a pilot of the aircraft 100 logs on to a CPDLC session using identifying ATC center information for the desired ATC center. However, traditional processes for logging into a CPDLC session with an ATC center may detrimentally affect a flight. For example, traditional logging on processes may take undue time away from other flight tasks, be difficult to maintain, and may have a probability of error. In certain implementations of the present disclosure, to reduce the negative impacts on a flight, the aircraft 100 acquires identifying information for a particular ATC center through communications with a data center 106. The data center 106 may be a ground data center that controls aircraft operations information for a private fleet of aircraft or the data center 106 may transmit airline operations communications in support of a fleet of aircraft affiliated with a commercial airline. In at least one implementation, the data center 106 receives information from both the first ATC center 102 and the second ATC center 104 such that the first ATC center 102 and the second ATC center 104 transmit their respective identifying information to the data center 106. When the data center 106 receives identifying information for an ATC center, be it the first ATC center 102 or the second ATC center 104, the data center 106 stores the identifying information in a database for transmission to aircraft 100.

In certain implementations, an aircraft 100 establishes a aircraft datalink with the data center 106 through either first communication link 114 or second communication link 116. When the aircraft 100 establishes the aircraft datalink, the data center 106 transmits identifying information for an ATC center needed by the aircraft to logon with an ATC center for the purposes of establishing a CPDLC session. For example, after the aircraft 100 establishes an aircraft datalink with the data center 106, the data center 106 identifies the position of the aircraft based on data received from the aircraft or by tracking the position of the aircraft. The data center 106 also determines that the aircraft 100 should establish a CPDLC session with the first ATC center 102. The data center 106 then transmits the identifying information for the first ATC center 102 that the aircraft 100 uses to establish a CPDLC session with the first ATC center 102 to the aircraft 100. In certain implementations, when the aircraft 100 receives the identifying information for the first ATC center 102, the data is stored in an incremental database located in memory on the aircraft 100. Further, once the initial CPDLC session is established between the aircraft 100 and the first ATC center 102, the aircraft 100 may pass into a region of airspace controlled by the second ATC center 104. To form a CPDLC session with the second ATC center 104, the aircraft can acquire the identifying information from either the data center 106, or from the first ATC center 102, when the aircraft 100 does not have the identifying information for the second ATC center 104 already stored in memory. In another example, when the first ATC center 102 is a FANS ATC center, the first ATC center 102 provides the name of the second ATC center 104 to the aircraft 100. The aircraft 100 then communicates with the data center 106 to acquire the ATN address for the second ATC center 104. When the aircraft 100 acquires the identifying information for the second ATC center 104, the aircraft 100 establishes a second ATC datalink 116 and stores the identifying information for the second ATC center 102 in a database if the identifying information was not already stored in the database.

Figure 2:
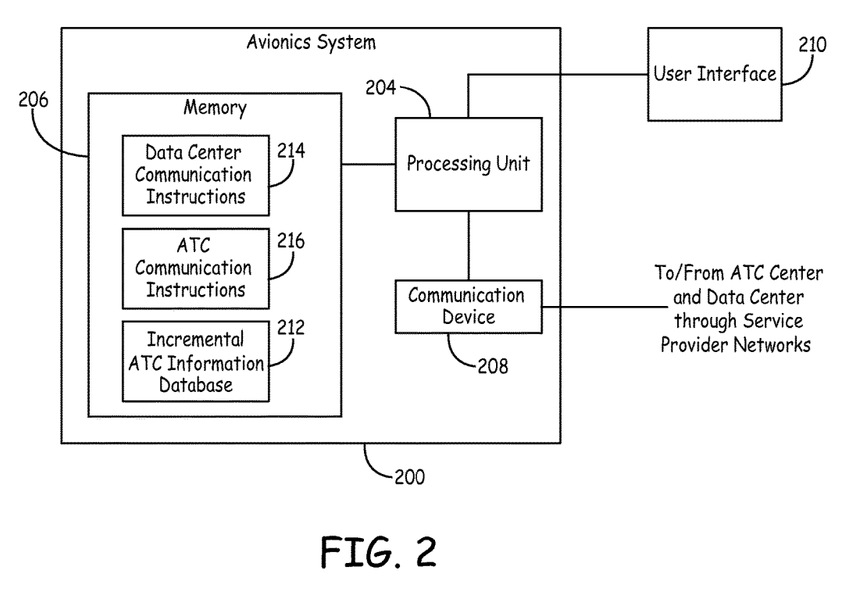
FIG. 2 is a block diagram of an avionics system in one embodiment described in the present disclosure.

FIG. 2 is a block diagram of an avionics system 200 that can be located on an aircraft such as aircraft 100 in FIG. 1. The avionics system 200 may be implemented as a communications management unit (CMU), a flight management computer, a communications management function, data radios, a flight management function, and/or other avionics computer. In certain implementations, the avionics system 200 may comprise multiple systems that communicate with each other to provide the functionality described in relation to the avionics system 100. The avionics system 100 comprises at least one processing unit 204 and at least one memory 206, where the memory 206 is in communication with the processing unit 204. In at least one exemplary implementation, the avionics system 200 includes a communication device 208 that is in communication with processing unit 204. The communication device 208 also communicates with at least one antenna through which the communication device 208 receives and transmits electromagnetic signals containing information with other communication devices located on other aircraft or on the ground Further, the processing unit 204 and avionics system 200 may also be in communication with a user interface 210. In at least one implementation, the user interface 210 is a multi-control display unit (MCDU), a multi function display (MFD) system, and the like. For example, the user may initiate a flight by communicating with a data center through the user interface 210 and the avionics system 200.

As described above, the processing unit 204 may be implemented through any of several means that are available. For example, elements of the processing unit 204 may be realized through discrete electronics, digital computer systems, digital signal processors, microprocessors, programmable controllers and field programmable gate arrays (FPGAs) or application-specific integrated circuits (ASICs). Therefore, other embodiments of the present invention may be program instructions resident on non-transient computer readable storage media such as memory 206, which when implemented by such means, enable the processing unit 204 to implement embodiments of the present invention. Computer readable storage media (such as memory 206) are any form of a physical non-transitory computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other non-transitory form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

In certain embodiments, the memory 206 stores computer executable instructions that enable the avionics system 200 to establish CPDLC sessions with ATCs. For example, the memory 206 includes data center communication instructions 214. The data center communication instructions 214 enable the avionics system 200 to communicate with a ground data center that is associated with the aircraft containing the avionics system 200. In the example illustrated in FIG. 1, the execution of the data center communication instructions 214 by the processing unit 204 would enable communication between the avionics system located on aircraft 100 and the data center 106 located on the ground. Further, the memory 206 stores ATC communication instructions 216, where execution of the ATC communication instructions 216 by the processing unit 204 enables communications between an aircraft (such as aircraft 100 in FIG. 1) and an ATC center (such as the first ATC center 102 or second ATC center 104 in FIG. 1).

In at least one implementation, at the beginning of a flight or in other phases of aircraft operation, the processing unit 204 executes the data center communication instructions 214 to communicate with a data center through the communication device 208. In at least one example, the processing unit 204, upon executing the data center communication instructions transmits information to a data center such that the data center is able to identify an ATC center that should communicate with the aircraft. For example, the processing unit 204 communicates data that includes position, trajectory, velocity, and the like. When the data center receives the information from the avionics system 200, the data center transmits ATC identifying information to the avionics system 200, where the processing unit 204 uses the received ATC identifying information to log on to a CPDLC session with an ATC by executing the ATC communication instructions 216. In certain implementations, the processing unit 204 stores the received ATC identifying information in an incremental ATC information database 212, stored in memory 206. The incremental ATC information database 212 contains a listing of ATC centers and associated identifying information for the ATC centers. For example, when the ATC centers are ATN ATC centers, the identifying information is address information that is necessary for the aircraft to communicate to ATC centers in order to establish a CPDLC session with ATN ATC centers. In certain implementations, the avionics system 200 searches the incremental ATC information database 212 for the identifying information before requesting the identifying information from the data center. In a further implementation, the avionics system 200 requests the identifying information from the data center to verify that the identifying information in the incremental ATC information database 212 is correct.

In certain embodiments, the incremental ATC information database 212 may not include the identifying information for a particular ATC center. When the avionics system 200 attempts to establish a CPDLC session with the ATC center not identified in the incremental ATC information database, the data center communication instructions 214 direct the processing unit 204 to acquire identifying information for the particular ATC center from the data center. In certain implementations, when the processing unit 204 acquires the identifying information from the ATC center, the processing unit 204 stores the identifying information for the particular ATC center in the incremental ATC information database 212. In certain embodiments, when the data is stored in the incremental ATC information database 212, the processing unit 204 accesses the incremental ATC information database 212 when executing the ATC communication instructions 216 to acquire the identifying information that is used to log on to a CPDLC session with the ATC center. Alternatively, the processing unit 204 immediately uses the identifying information to log on to a CPDLC session with the ATC center instead of storing the identifying information in the incremental ATC information database 216.

As described above, when the incremental ATC information database 212 fails to contain identifying information for an ATC center, the avionics system 200 acquires the identifying information from a data center through the execution of data center communication instructions 214. By acquiring the identifying information from the data center, an organization that controls the aircraft may save money as the incremental ATC information database 212 can be incrementally updated with new ATC center identifying information in the course of the operation of the aircraft as compared to individually updating the entire ATC information database 212 on all aircraft that may communicate with the new ATC center as part of flight preparation or while in flight.

Figure 3:
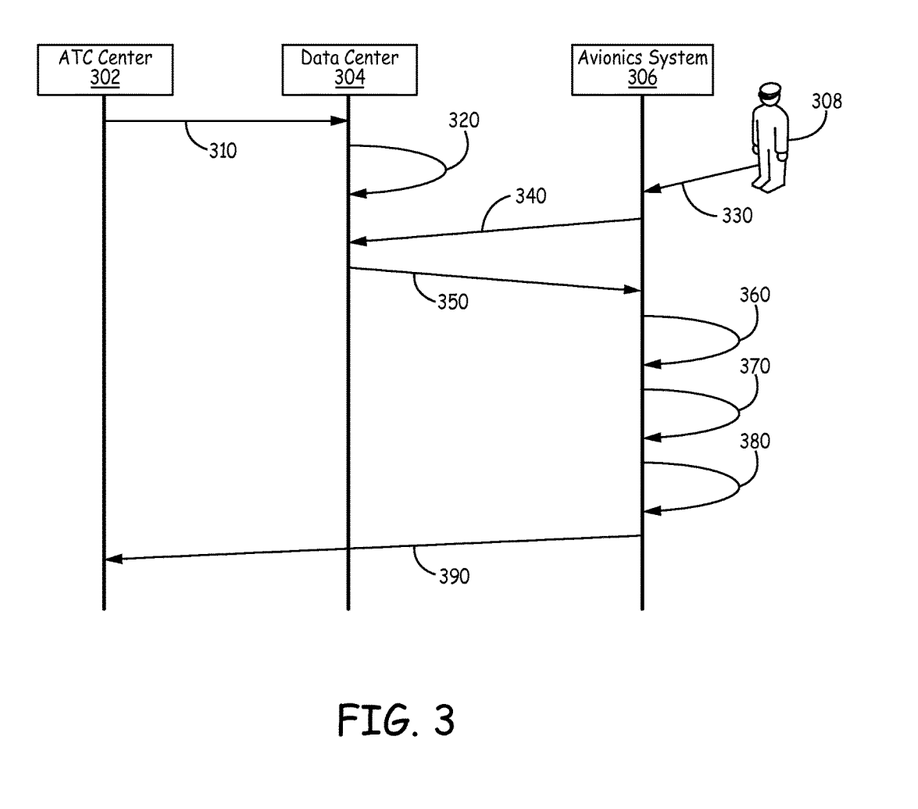
FIG. 3 is a sequence diagram for establishing a communication session between an aircraft and an ATC center in one embodiment described in the present disclosure.

FIG. 3 is a diagram of a sequence 300 for establishing a CPDLC session between an avionics system 306 and an ATC center 302 by acquiring the identifying information for the ATC center 302 from a data center 304 in at least one implementation. To establish the CPDLC session the sequence 300 proceeds at 310 where the ATC center 302 communicates its identifying information to the data center 304. Alternatively, the data center 304 acquires a published resource that provides the identifying information for the ATC centers. The sequence 300 proceeds at 320 where the data center 304 saves the identifying information received from the ATC center 302 in a database located on the data center 304. In at least one implementation, the communication of identifying information from the ATC center 302 to the data center 304 and the subsequent saving of the identifying information in a database may be performed independent of the flight of an aircraft.

In at least some implementations, when the identifying information for the ATC center 302 is stored on the data center 304, the avionics system 306 can receive the identifying information from the data center 304. For example, the sequence 300 proceeds at 330 where a pilot 308 (or other flight crew member) requests a flight initialization at the beginning of a flight or other aircraft communication. When the pilot 308 requests the flight initialization, the sequence 300 proceeds at 340 where the avionics system 306 transmits a flight initialization downlink to the data center 304. In certain implementations, the avionics system 306 may request identifying information for an ATC center 302. When the data center 304 receives the flight initialization downlink, the sequence proceeds to 350, where the data center 304 transmits a flight initialization uplink to the avionics system 306. In at least one embodiment, when the data center 304 transmits the flight initialization uplink to the avionics system 306, the data center 304 includes the identifying information for the ATC center 302 in the information transmitted as part of the flight initialization uplink. In alternative implementations, the data center 304 sends the identifying information for the ATC center 302 to the avionics system 306 in response to a request for identifying information.

In certain embodiments, when the avionics system 306 receives the flight initialization uplink from the data center 304, the sequence 300 proceeds at 360, where the avionics system 306 uses the identifying information for the ATC center 302 received from the data center 304 to update ATC address information for logging on to a CPDLC session with the ATC center 302. Optionally, after receiving the identifying information for the ATC center 302 from the data center 304, the sequence 300 proceeds at 370, where the avionics system 306 stores the identifying information in memory in the avionics system 306. For example, the avionics system 306 stores the identifying information in an ATC information database 212 stored on the avionics system 306. In at least one exemplary implementation the avionics system 306 can store the identifying information in memory at any time after the reception of the identifying information for the ATC center 302. Further, to logon to the CPDLC session with the ATC center 302, the sequence proceeds to 380, where a message is generated to notify the pilot 308 or other flight crew member that the avionics system 306 is ready to establish a CPDLC session with the ATC center 302. Because the logon information is already populated in the apparatus for establishing a CPDLC session, the sequence 300 proceeds at 390 and logs on to a CPDLC session with the ATC center 302 at the direction of the pilot 308. Alternatively, the avionics system 306 logs on to the CPDLC session with the ATC center 302 as soon as the CPDLC session is able to be established.

Figure 4A:
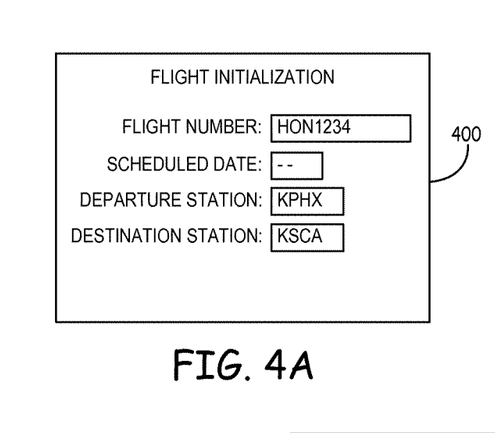
FIGS. 4A-4C are illustrations of screens provided to a pilot through a user interface in one embodiment in the present disclosure.
Figure 4B:
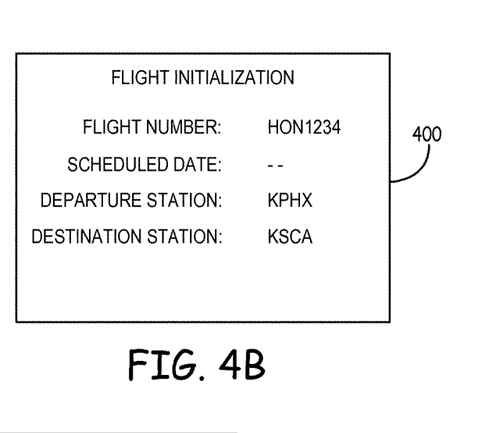
Figure 4C:
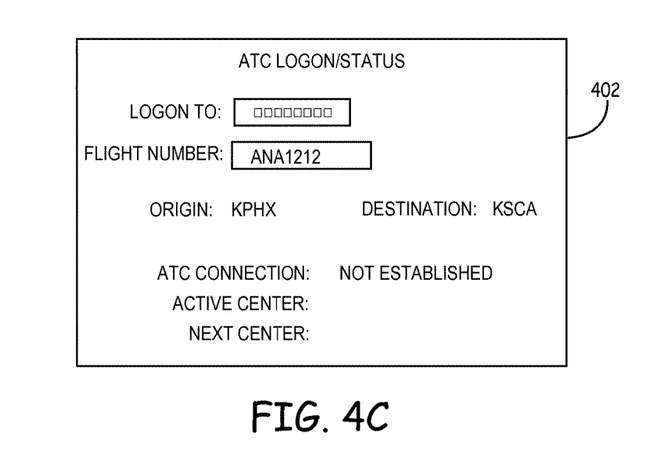

FIGS. 4A-4C are illustrations of screens provided by an avionics system to a pilot through a user interface (such as user interface 210 in FIG. 2) when initializing a flight with a data center and establishing a CPDLC session with an ATC center. For example, FIGS. 4A and 4B are illustrations of a screen 400 that is used to initialize a flight with a data center. As illustrated in FIG. 4A, the outlined fields can be filled in by a user. When the data center sends an aircraft communication uplink to the avionics system, the avionics system populates the fields on the flight initialization screen 400 as illustrated in FIG. 4B.

FIG. 4C is an illustration of a logon screen 402 for logging into a CPDLC session with an ATC center. As discussed above, when a data center sends an aircraft communication uplink to an aircraft, the data center may also transmit identifying information to the aircraft, where the identifying information identifies an ATC center and the identifying information is used by the aircraft for logging into a CPDLC session with the ATC center. In certain implementations, when the aircraft receives the identifying information, the aircraft saves the identify information for the ATC center in a memory on the aircraft for future use when the aircraft establishes CPDLC sessions with the ATC center.

Figure 5:
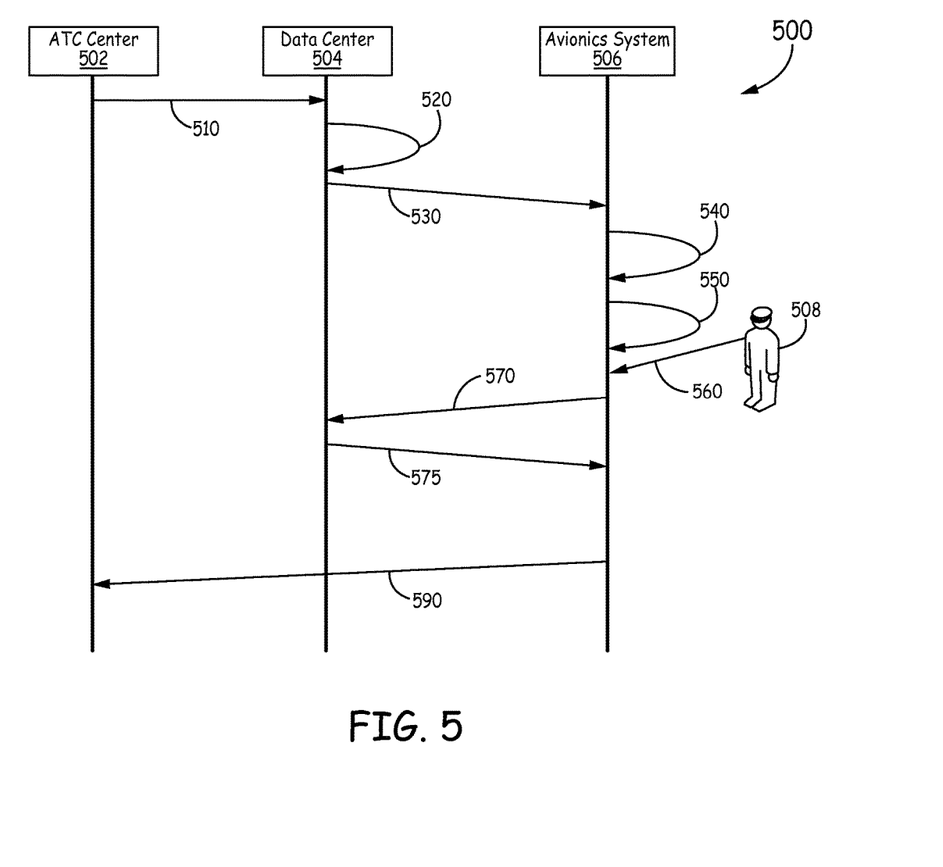
FIG. 5 is a sequence diagram for establishing a communication session between an aircraft and an ATC center in one embodiment described in the present disclosure.

In at least one alternate exemplary implementation, a data center may send identifying information for an ATC center to an avionics system, where the identifying information is transmitted to the avionics system independently of flight initialization communications. For example, FIG. 5 is a diagram of a sequence 500 for establishing a CPDLC session between an avionics system 506 and an ATC center 502 by acquiring the identifying information from a data center 504 independently of flight initialization communications. To establish the CPDLC session the sequence 500 proceeds at 510 where the ATC center 502 communicates its identifying information to the data center 504. The sequence 500 proceeds at 520 where the data center 504 saves the identifying information received from the ATC center 502 in a database located on the data center 504. In at least one implementation, the communication of identifying information from the ATC center 502 to the data center 504 and the subsequent saving of the identifying information in a database may be performed independent of the flight of an aircraft containing the avionics system 506.

In at least some implementations, when the identifying information for the ATC center 502 is stored on the data center 504, the avionics system 506 can receive the identifying information from the data center 504. For example, when the data center 504 receives the identifying information from the ATC center 502, the sequence 500 proceeds to 530 where the data center 504 transmits the identifying information for the ATC center 502 to the avionics system 506. In alternative implementations, the data center 504 sends the identifying information for the ATC center 502 to the avionics system 506 in response to a request for identifying information.

In certain embodiments, when the avionics system 506 receives the identifying information for the ATC center 502 from the data center 504, the sequence 500 proceeds at 540, where the avionics system 506 uses the identifying information for the ATC center 502 received from the data center 504 to update ATC address information for logging on to a CPDLC session with the ATC center 502. Optionally, after receiving the identifying information for the ATC center 502 from the data center 504, the sequence 500 proceeds at 550, where the avionics system 506 stores the identifying information in memory in the avionics system 506. For example, the avionics system 506 stores the identifying information in an ATC information database located on the avionics system 506. In at least one exemplary implementation the avionics system 506 can store the identifying information in memory at any time after the reception of the identifying information for the ATC center 502.

In a further exemplary implementation, the sequence 500 proceeds at 560 where a pilot 508 (or other flight crew member) requests a flight initialization at the beginning of a flight or initiates the sending of an aircraft communication to a data center. When the pilot 508 requests the flight initialization, the sequence 500 proceeds at 570 where the avionics system 506 transmits a flight initialization downlink to the data center 504. In response to the flight initialization downlink, the sequence 500 proceeds at 575, where the data center 504 transmits a flight initialization uplink to the avionics system 506. In certain implementations, the flight initialization uplink indicates which ATC center should be used to establish a CPDLC session plus its associated ATN Address. Because the logon information is already populated in the apparatus for establishing a CPDLC session, the sequence 500 proceeds at 590 and logs on to a CPDLC session with the ATC center 502 at the direction of the pilot 508. Alternatively, the avionics system 506 logs on to the CPDLC session with the ATC center 502 as soon as the CPDLC session is able to be established. In a further example, the establishment of the CPDLC session and the flight initialization are performed interchangeably.

Figure 6:
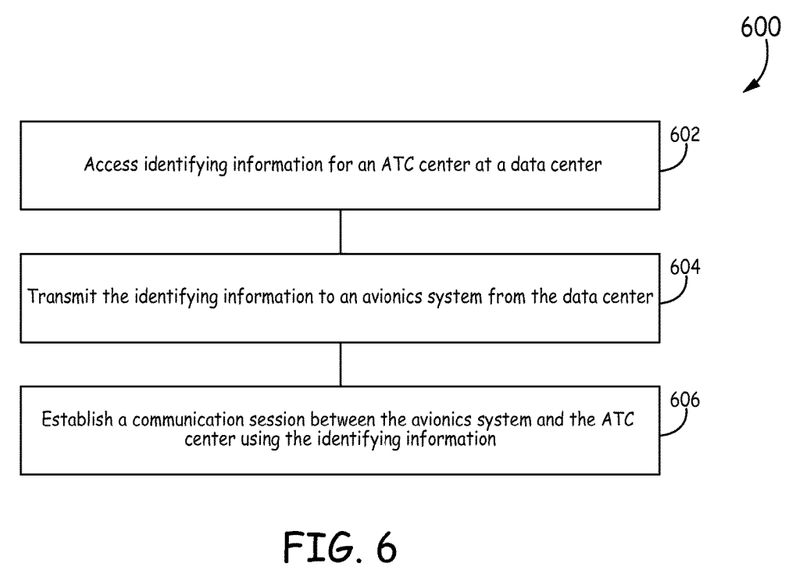
FIG. 6 is a flow diagram of a method for establishing a communication session with an ATC center in one embodiment described in the present disclosure.

FIG. 6 is a flow diagram of a method 600 for establishing a communication session with an ATC center. Method 600 proceeds at 602 where identifying information for an ATC center is accessed at a data center. For example, an ATC center may transmit an ATN address to a data center, where the data center controls flight operations for a fleet of aircraft. Further, the data center may access the identifying information in a published document containing identifying information. Method 600 proceeds to 604, where the identifying information is transmitted to an avionics system from the data center. For example, the avionics system may not have the identifying information needed to establish a communication session with the ATC center. To acquire the identifying information, the avionics system communicates with the data center to acquire the identifying information. In at least one exemplary implementation, the avionics system acquires the identifying information through flight initialization communications with the ATC center. When the avionics system acquires the identifying information, method 600 proceeds at 606 where a communication session is established between the avionics system and the ATC center using the identifying information. For example, the avionics system uses the acquired identifying information to populate a logon screen on a user interface and then logon to a controller pilot data link communication session between the avionics system and the ATC center.

Example Embodiments

Example 1 includes an avionics system, the system comprising: a communication device configured to communicate with a data center and an air traffic control center; and a processing unit configured to execute machine readable instructions that cause the processing unit to: manage communications associated with the flight of an aircraft, wherein the communications are communicated through the communication device with the data center; distinguish identifying information received through the communication device, wherein the identifying information identifies at least one of the air traffic control center and associated aeronautical telecommunications network address; and establish a communication session with the air traffic control center using the identifying information received through the communication device.

Example 2 includes the avionics system of Example 1, wherein the identifying information is received from the data center.

Example 3 includes the avionics system of any of Examples 1-2, wherein the identifying information is received with the initialization communications.

Example 4 the avionics system of any of Examples 1-2, wherein the identifying information is received independently of the initialization communications.

Example 5 includes the avionics system of any of Examples 1-3, further comprising a memory, wherein the memory is configured to store the identifying information in an incremental air traffic controller information database.

Example 6 includes the avionics system of Example 5, wherein establishing the communication session with the air traffic control center comprises: determining if the identifying information is stored in the incremental air traffic controller information database; when the identifying information is stored in the incremental air traffic controller information database, using the identifying information to establish the communication session with the air traffic control center; and when the identifying information is not stored in the incremental air traffic controller information database, requesting the identifying information from the data center and updating the identifying information for the air traffic control center in the incremental air traffic controller information database.

Example 7 includes the avionics system of any of Examples 1-6, wherein the avionics system receives next identifying information from the air traffic control center, wherein the next identifying information identifies a second air traffic control center for establishing a second communication session with the second air traffic control center.

Example 8 includes the avionics system of any of Examples 1-7, wherein the identifying information indicates an aeronautical telecommunications network address for the air traffic control center.

Example 9 includes the avionics system of any of Examples 1-8, wherein the processing unit is further configured to process commands received through a user interface.

Example 10 includes a system for providing air traffic control center identifying information to an aircraft, the system comprising: at least one air traffic control center that manages airspace over a region; a data center that manages flight operations of the aircraft; an avionics system on the aircraft, the avionics system comprising: a communication device configured to communicate with a data center and an air traffic control center through at least one communication link; and a processing unit configured to execute machine readable instructions that cause the processing unit to: acquire identifying information from communications received through the communication device, wherein the identifying information identifies at least one of the air traffic control center and associated aeronautical telecommunications network address; and establish a communication session with the air traffic control center using the identifying information received through the communication device.

Example 11 includes the system of Example 10, wherein the identifying information for the air traffic control center includes an aeronautical telecommunications network address.

Example 12 includes the system of any of Examples 10-11, wherein the processing unit acquires the identifying information by: transmitting an aircraft communication downlink to the data center through the communication device; receiving an aircraft communication uplink from the data center through the communication device; and identifying the identifying information in data associated with the aircraft communication uplink.

Example 13 includes the system of any of Examples 10-12, wherein the data center transmits the identifying information to the avionics system in response to a request for identifying information from the avionics system.

Example 14 includes the system of any of Examples 10-13, further comprising a user interface configured to enable a user to interact with the avionics system.

Example 15 includes the system of any of Examples 10-14, wherein the avionics system further comprises a memory configured to store the identifying information for the at least one air traffic control center.

Example 16 includes a method for providing identifying information for an air traffic controller to an aircraft, the method comprising: accessing identifying information for the air traffic control center at a data center; transmitting the identifying information for the air traffic control center to an avionics system on the aircraft from the data center; and establishing a communication session between the avionics system and the air traffic control center using the identifying information.

Example 17 includes the method of Example 16, further comprising storing the identifying information in an air traffic controller information database.

Example 18 includes the method of any of Examples 16-17, further comprising determining the location of the aircraft; and identifying the air traffic control center associated with the location of the aircraft.

Example 19 includes the method of any of Examples 16-18, wherein transmitting the identifying information comprises: receiving a command from a user through a user interface to initialize a flight with the data center; transmitting a flight initialization downlink from the avionics system to the data center; and transmitting a flight initialization uplink from the data center to the avionics system, wherein the identifying information is transmitted as part of the flight initialization uplink.

Example 20 includes the method of any of Examples 16-19, wherein the identifying information is transmitted to the avionics system in response to a request for identifying information.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An avionics system, the avionics system comprising:
   a communication device configured to communicate with a data center and an air traffic control center; and
   a processing unit configured to execute machine readable instructions that cause the processing unit to:
   manage communications associated with the flight of an aircraft, wherein the communications are communicated through the communication device with the data center;
   distinguish identifying information for the air traffic control center received through the communication device, wherein the identifying information for the air traffic control center includes an identifier for the air traffic control center and an aeronautical telecommunications network address of the air traffic control center; and
   establish a communication session with the air traffic control center using the identifying information for the air traffic control center received through the communication device.

2. The avionics system of claim 1, wherein the identifying information for the air traffic control center is received from the data center.

3. The avionics system of claim 1, wherein the identifying information for the air traffic control center is received with initialization communications.

4. The avionics system of claim 1, wherein the identifying information for the air traffic control center is received independently of initialization communications.

5. The avionics system of claim 1, further comprising a memory, wherein the memory is configured to store the identifying information for the air traffic control center in an incremental air traffic controller information database.

6. The avionics system of claim 5, wherein establishing the communication session with the air traffic control center comprises:
   determining if the identifying information for the air traffic control center is stored in the incremental air traffic controller information database;
   when the identifying information for the air traffic control center is stored in the incremental air traffic controller information database, using the identifying information for the air traffic control center to establish the communication session with the air traffic control center; and
   when the identifying information for the air traffic control center is not stored in the incremental air traffic controller information database, requesting the identifying information for the air traffic control center from the data center and updating the identifying information for the air traffic control center in the incremental air traffic controller information database.

7. The avionics system of claim 1, wherein the avionics system receives next identifying information for the air traffic control center from the air traffic control center, wherein the next identifying information for the air traffic control center includes an identifier of a second air traffic control center for establishing a second communication session with the second air traffic control center.

8. The avionics system of claim 1, wherein the processing unit is further configured to process commands received through a user interface.

9. A system for providing air traffic control center identifying information to an aircraft, the system comprising:
   a data center that manages flight operations of the aircraft;
   an avionics system on the aircraft, the avionics system comprising:
   a communication device configured to communicate with the data center and an air traffic control center through at least one communication link; and
   a processing unit configured to execute machine readable instructions that cause the processing unit to:

acquire identifying information for the air traffic control center from communications received through the communication device, wherein the identifying information for the air traffic control center includes an identifier for the air traffic control center and an aeronautical telecommunications network address of the air traffic control center; and establish a communication session with the air traffic control center using the identifying information for the air traffic control center received through the communication device.

10. The system of claim 9, wherein the processing unit acquires the identifying information for the air traffic control center by:

transmitting an aircraft communication downlink to the data center through the communication device;

receiving an aircraft communication uplink from the data center through the communication device; and identifying the identifying information for the air traffic control center in data associated with the aircraft communication uplink.

11. The system of claim 9, wherein the data center transmits the identifying information for the air traffic control center to the avionics system in response to a request for identifying information for the air traffic control center from the avionics system.

12. The system of claim 9, further comprising a user interface configured to enable a user to interact with the avionics system.

13. The system of claim 9, wherein the avionics system further comprises a memory configured to store the identifying information for the air traffic control center.

14. A method for providing identifying information for an air traffic controller to an aircraft, the method comprising:

accessing identifying information for the air traffic control center at a data center;

transmitting the identifying information for the air traffic control center to an avionics system on the aircraft from the data center, wherein the identifying information for the air traffic control center includes an identifier for the air traffic control center and an aeronautical telecommunications network address of the air traffic control center; and establishing a communication session between the avionics system and the air traffic control center using the identifying information for the air traffic control center.

15. The method of claim 14, further comprising storing the identifying information for the air traffic control center in an air traffic controller information database.

16. The method of claim 14, further comprising determining the location of the aircraft; and identifying the air traffic control center associated with the location of the aircraft.

17. The method of claim 14, wherein transmitting the identifying information for the air traffic control center comprises:

receiving a command from a user through a user interface to initialize a flight with the data center;

transmitting a flight initialization downlink from the avionics system to the data center; and transmitting a flight initialization uplink from the data center to the avionics system, wherein the identifying information for the air traffic control center is transmitted as part of the flight initialization uplink.

18. The method of claim 14, wherein the identifying information for the air traffic control center is transmitted to the avionics system in response to a request for identifying information for the air traffic control center.

19. The avionics system of claim 1, wherein the communication session with the air traffic control center comprises a controller-pilot data link communication session.

20. The system of claim 9, wherein the communication session with the air traffic control center comprises a controller-pilot data link communication session.

* * * * *